US011501276B1

(12) United States Patent
Srikrishnan et al.

(10) Patent No.: US 11,501,276 B1
(45) Date of Patent: Nov. 15, 2022

(54) RESILIENCY IN POINT OF SERVICE TRANSACTIONS USING DISTRIBUTED COMPUTING

(71) Applicant: INTERNATIONAL BUSINESS MACHINES CORPORATION, Armonk, NY (US)

(72) Inventors: Priti Srikrishnan, Bangalore (IN); Kiran Nayak, Bengaluru (IN); Mukundan Sundararajan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/403,132

(22) Filed: Aug. 16, 2021

(51) Int. Cl.
*G06Q 20/20* (2012.01)
*G06Q 20/40* (2012.01)

(52) U.S. Cl.
CPC ......... *G06Q 20/204* (2013.01); *G06Q 20/202* (2013.01); *G06Q 20/401* (2013.01)

(58) Field of Classification Search
CPC ... G06Q 20/204; G06Q 20/202; G06Q 20/401
See application file for complete search history.

(56) References Cited

U.S. PATENT DOCUMENTS

| | | | | |
|---|---|---|---|---|
| 10,237,000 B1* | 3/2019 | Buchsbaum | ............. | H04B 5/02 |
| 2007/0208832 A1* | 9/2007 | Traub | ..................... | H04L 67/34 |
| | | | | 340/572.1 |
| 2009/0192815 A1 | 7/2009 | Canada | | |
| 2010/0161433 A1 | 6/2010 | White | | |
| 2014/0052554 A1 | 2/2014 | Abraham | | |
| 2014/0229184 A1* | 8/2014 | Shires | .................... | H04L 12/282 |
| | | | | 704/275 |
| 2014/0304094 A1* | 10/2014 | Reddy | ................. | G02B 6/0088 |
| | | | | 705/16 |
| 2014/0344446 A1* | 11/2014 | Rjeili | ..................... | H04L 43/04 |
| | | | | 709/224 |

(Continued)

FOREIGN PATENT DOCUMENTS

WO 2012068289 A1 5/2012

OTHER PUBLICATIONS

Yang, Anjia, and Gerhard P. Hancke. "RFID and Contactless Technology." (2017). (Year: 2017).*

(Continued)

*Primary Examiner* — Asfand M Sheikh
(74) *Attorney, Agent, or Firm* — Tutunjian & Bitetto, P.C.; Michael A. Petrocelli

(57) ABSTRACT

Performing point of sale transactions are performed by configuring a point of service (POS) environment with a sensor pod including an active sensor and a passive sensor. A first signal is sent from the active sensor of the sensor pod to a user device that is initiating a sale for a service. A converted first signal is received at the active sensor, wherein the converted version of the first signal includes identification information for the user. It can be determined that the active sensor of the sensor pod of the point of service environment has not functioned. A user wake up call is received from the user device at the passive sensor of the sensor pod. Functionality of the active sensor is restored with a POS wake up signal sent from the passive sensor to the active sensor.

20 Claims, 7 Drawing Sheets

(56) References Cited

U.S. PATENT DOCUMENTS

| | | | | |
|---|---|---|---|---|
| 2015/0180543 | A1* | 6/2015 | Verma | G06F 1/1694 |
| | | | | 455/41.1 |
| 2017/0039405 | A1* | 2/2017 | Twogood | G06K 7/10089 |
| 2020/0410809 | A1* | 12/2020 | Gotlieb | G06Q 20/3274 |
| 2021/0049612 | A1 | 2/2021 | Chen | |
| 2021/0233372 | A1* | 7/2021 | Bergman | G08B 13/2448 |

OTHER PUBLICATIONS

Rout, Debasish, and Arvind Kumar Jain. "The Role of Digital Technology in Retailing." Asian Journal of Business and Economics 2.3 (2012). (Year: 2012).*

Miarforio, Claudio, et al. "Smartphones as Practical and Secure Location Verification Tokens for Payments," NDSS, Feb. 2014, 15 pages, 14.

Anonoymous, "What is RFID and How Does RFID Work?—AB&R", https://www.abr.com/what-is-rfid-how-does-rfid-work/, Jun. 2021, 4 pages.

Anonoymous, "FAQ BDS Laundry Card System FAQ," https://www.bdslaundry.com/customer-service/faq/#hfaq-post-5599, Jun. 2021, 3 pages.

Abdulla, Raed, et al., "Electronic toll collection system based on radio frequency identification system," International Journal of Electrical and Computer Engineering, Jun. 2018, pp. 1602-1610, 8, 3.

Sorensen, Tod, "Boost Efficiency, Profits with 'Makes Sense' Programming (Part 1)," https://americancoinop.com/articles/boost-efficiency-profits-makes-sense-programming-part-1, Nov. 2019, 2 pages.

Iyengar, Ashok, "Architeching at the Edge, What does it mean to deploy an edge computing solution, where does it makes sense, and what are the common requirements?" https://www.ibm.com/cloud/blog/architecting-at-the-edge, Oct. 2019, 8 pages.

Beggs, Bruce, "Advances in Laundry Equipment Technology (Conclusion)," https://americancoinop.com/articles/advances-laundry-equipment-technology-conclusion. May 2020, 3 pages.

Mell, Peter, et al., "The NIST Definition of Cloud Computing," Sep. 2011, 7 pages.

* cited by examiner

RESILIENCY IN POINT OF SERVICE TRANSACTIONS USING DISTRIBUTED COMPUTING

BACKGROUND

The present invention generally relates to digital transactions, and more particularly to resiliency in point of service transactions.

In the world of expanding micro financial transactions cash exchange has given way to digital cash transactions in a very large way. There are a number of transactions that are low value, and saves time for the users when they work seamlessly and successfully. However, a number of transaction can end up with users spending a disproportionately large amount of time and resources when the transactions do not finish successfully for a variety of reasons and user services based on conclusion of such transactions. Resiliency becomes a factor as the volume of such transactions is very high, the charges are not very high, and hence building multiple infrastructure pillars to support the scale and trust needed is expensive. Resiliency can be desired across multiple players, platforms and applications and is preferably end-to-end up to and including the users equipment, for example. A number of services require that inputs, such as reflected radio waves or images that are obtained from end user devices are captured by sensors that generate the source signals as the first step, which is sent to back end systems for completing other transactions that form the approval step for initiating the control signal to start a service or an activity. There are several points of failure either or both at the enterprise end and the end user devices. The lack of information on the point(s) of failure causes a high cost.

SUMMARY

In accordance with an embodiment of the present invention, a computer-implemented method for performing point of sale transactions (POS) is provided that configures a point of service (POS) environment with a sensor pod for conducting digital financial transactions, the sensor pod including an active sensor and a passive sensor. In a sales transaction, a first signal is sent from the active sensor of the sensor pod to a user device that is initiating a sale for a service. The user device sends a converted version of the first signal to the active sensor. The converted version of the first signal includes identification information for the user. If it is determined that the active sensor of the sensor pod of the point of service environment has no functioned to receive the converted version of the first signal, a user wake up signal can be received from the user device at the passive sensor of the sensor pod. Functionality of the active sensor can be restored with a POS wake up signal sent from the passive sensor of the sensor pod to the active sensor of the sensor pod.

In another embodiment of the present invention, a system for performing point of sale transactions (POS) is provided. The system may include a hardware processor; and a memory that stores a computer program product. The computer program product which, when executed by the hardware processor, causes the hardware processor to configure a point of service (POS) environment with a sensor pod for conducting digital financial transactions, the sensor pod including an active sensor and a passive sensor; and send a first signal from the active sensor of the sensor pod to a user device that is initiating a sale for a service. The computer program product can also receive a converted version of the first signal from the user device at the active sensor, wherein the converted version of the first signal includes identification information for the user; and determine that the active sensor of the sensor pod of the point of service environment has no functioned to receive the converted version of the first signal. In some embodiments, the system can further receive a user wake up signal from the user device at the passive sensor of the sensor pod; and restore functionality with a POS wake up signal sent from the passive sensor of the sensor pod to the active sensor of the sensor pod.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
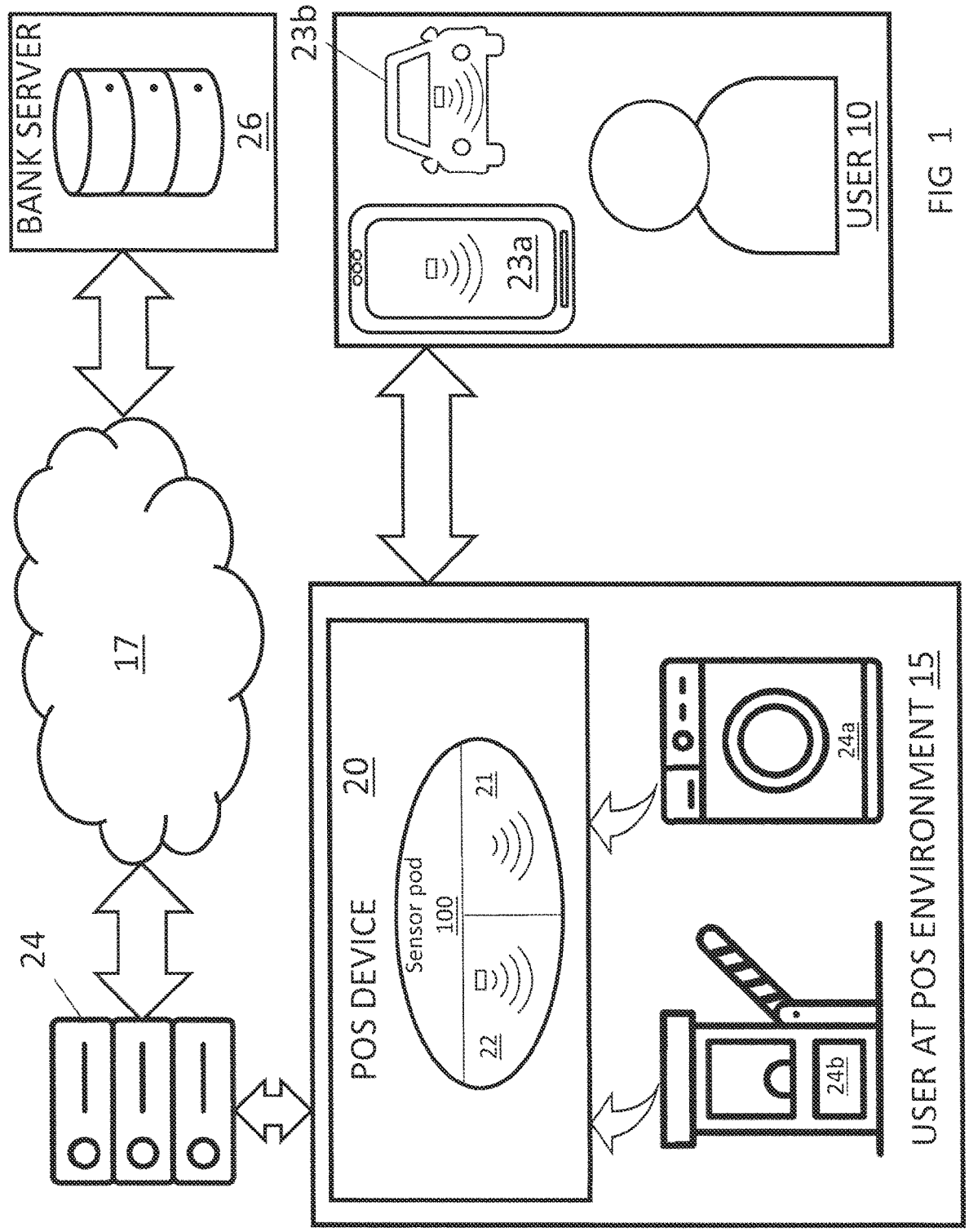
FIG. 1 is a diagram illustrating an exemplary environment, in which systems, methods and computer program products are employed to provide user loop resiliency in point of service transaction, in accordance with one embodiment of the present disclosure.

Payment resilience refers to the capability of a payments service to maintain its uptime and provide resistance to attack and downtime. There is a need in point of service (POS) transactions to improve resiliency, where a service/activity not being started can lead to a build-up of queue leading to higher cost for the enterprise. Two examples for POS services may include toll booths and pay for service laundry machines. In one example, in which payments for vehicles traveling through a toll both employs radio-frequency identification (RFID) tags, if the RFID tag malfunctions then the vehicles are not able to pass through a toll, unless a higher cost manual toll collection path is selected. In another example, if a washing machine enablement card in a community washing center is not recognized due to a faulty card reader, the result can be readjustments to schedules and delays in tasks to be performed. These are just two examples of how failures in POS transactions can result in higher costs.

Fault logging and analysis tools for events/transactions are available. However, when the scanner/reader does not work, there is no ready analysis/log/error message to call out where the error or failure has occurred, e.g., in the scanner or the reader. There is no automatic trigger to initiate the alternate path to create/complete the pending transaction. The instance of failures also do not get captured as a definite fault logging mechanism has not been established, hence the trigger to initiate an alternate mechanism becomes a factor to complete the transaction at hand. In some examples, after a transaction is initiated, when any step is not completed due to errors say from connecting to sensors, the error logs can be available for tracking. However, when sensors initiate a signal and passive sensor responses are not correctly captured, they do not initiate error warnings.

The above tools/methods do not provide mechanisms to indicate that the passive sensors that need to transform the input signals are malfunctioning. Alternate paths to record the missing transactions are available, but initiating the related activities do not exist. These tools do not provide automatic guidance/alternate path recommendations. The alternative path is currently triggered manually while the cause of error remains subjective/speculative. Since the sensor-based errors cannot be easily attributable to malfunctioning passive sensor or active sensor with the signal loop is showing as functional, the alternate paths triggered do not relate well to the original path.

The methods, systems and computer program products that are described herein provide loop resiliency in point of service (POS) transactions. In some embodiments, dynamic alternate pathways for service delivery are created when a service fails. In some embodiments of the methods, systems and computer program products of the present disclosure, when detecting failures after a transaction has commenced, and the failure is at the starting point, e.g., the sensor reading/detecting the signal, triggering the alternate paths is seamless. This improves the resiliency of the total system.

In some embodiments, the methods and systems for providing user loop resiliency in point of sale applications employs a multi-sensor approach. However, this is only one embodiments of the present disclosure, and in some other embodiments, the signal generation device is configured for one type of signal only. Adding multiple signal generation or signal modification devices can be expensive as it can run into millions of devices on the user end. If there was a requirement to have multiple passive sensors, considering the variety of end user devices, the requirement to have multiple passive sensors would make installation, change and management very difficult.

In some embodiments, the methods, systems and computer program products employ a paired sensor approach where the existing method of using an active sensor signal generation unit is paired with a passive sensor unit that is triggered if the passive sensor on the user end does not trigger the function/activity that such a sensory measurement should initiate. Event based triggering is the sought-after method as it avoids continuous monitoring and expenditure of energy across the system.

The methods, systems and computer program products that are described herein propose a mechanism where leveraging the features of edge computing will help resolve the aforementioned disadvantages with the business end of the transaction with sensors incorporating an active/passive twin sensor pod. "Edge computing" is a distributed computing paradigm that brings computation and data storage closer to the sources of data. When the active signal sensor does not work with the passive sensor on the user end, the user triggers the passive sensor in the sensor twin pod by triggering a high energy pulse that acts as the wake-up alert. In some embodiments, the passive sensor circuitry is activated by a LiFi enabled signal. "Li-Fi (also written as LiFi)" is a wireless communication technology which utilizes light to transmit data and position between devices. In some examples, the LiFi signal may be provided by a mobile camera flash or an ultrasound ping with data riding the signal envelope or an TDM (Time Division Multiplexing)/FDM (Frequency Division Multiplexing) mode. The mobile number of the alerting device is captured and sets of the backend processing to activate the associated sub-processes, such as boom barrier opening, washing cycle powering, or other actions. This way while the passive sensor in the user device can be corrected post the action, the resiliency of the low-cost cycle activities are not held back. The methods, systems and structures of the present disclosure are now described with reference to FIGS. 1-7.

Figure 2:
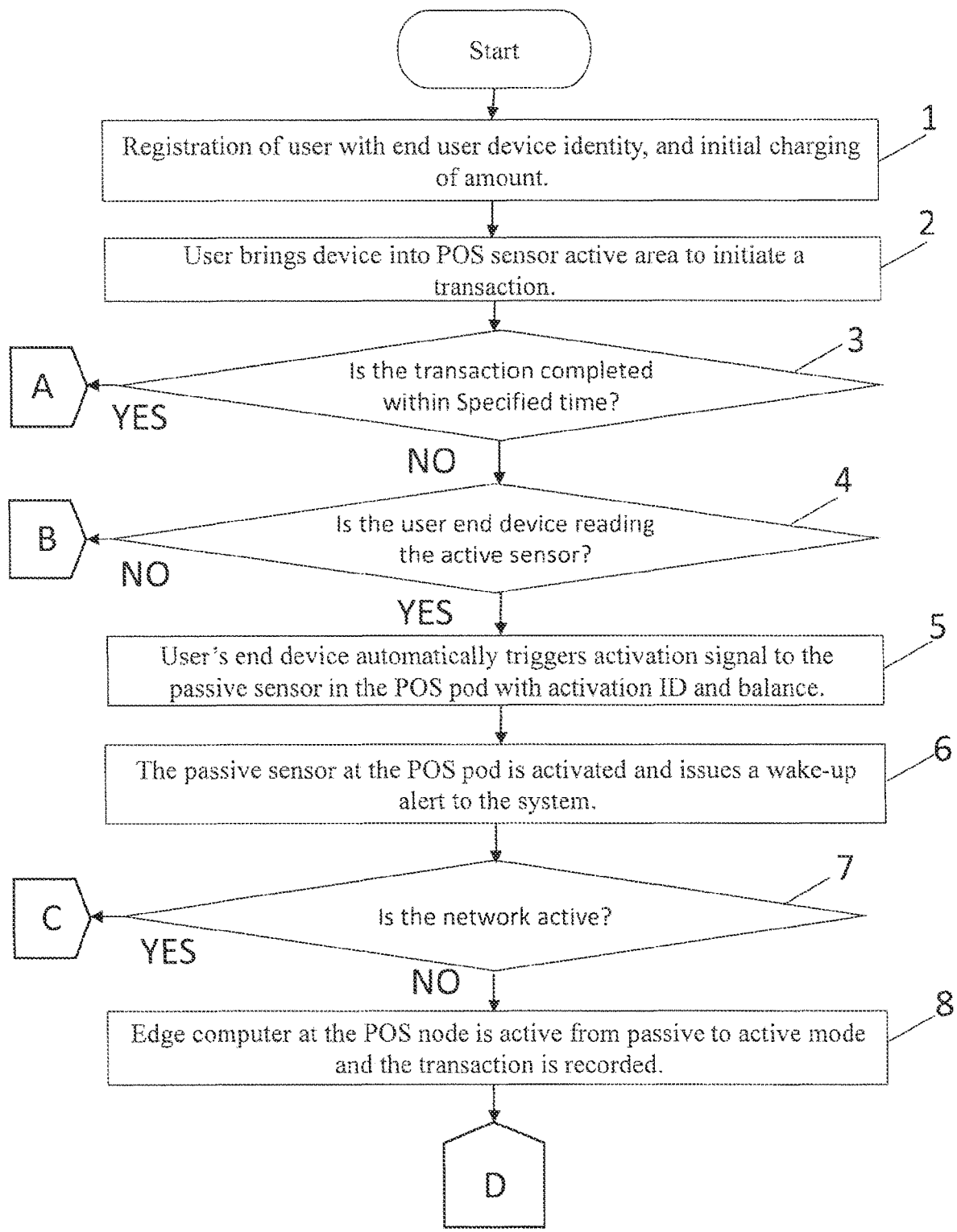
FIG. 2 is a flow chart/block diagram illustrating a method that provides user loop resiliency at point of service transactions, in accordance with one embodiment of the present disclosure.
Figure 3:
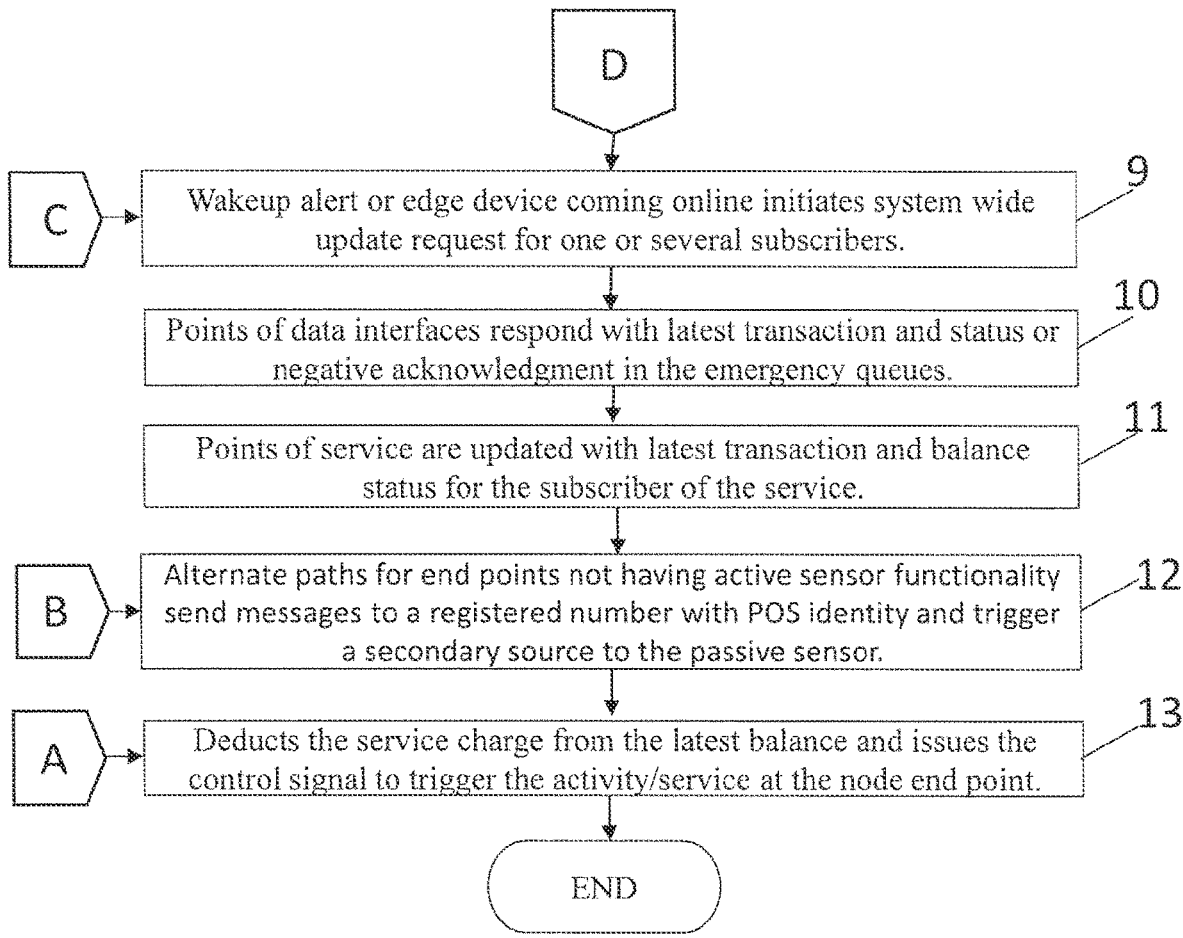
FIG. 3 is a flow chart/block diagram illustrating a method that provides user loop resiliency at point of service transactions, which is a continuation from FIG. 2, in accordance with one embodiment of the present disclosure.
Figure 4:
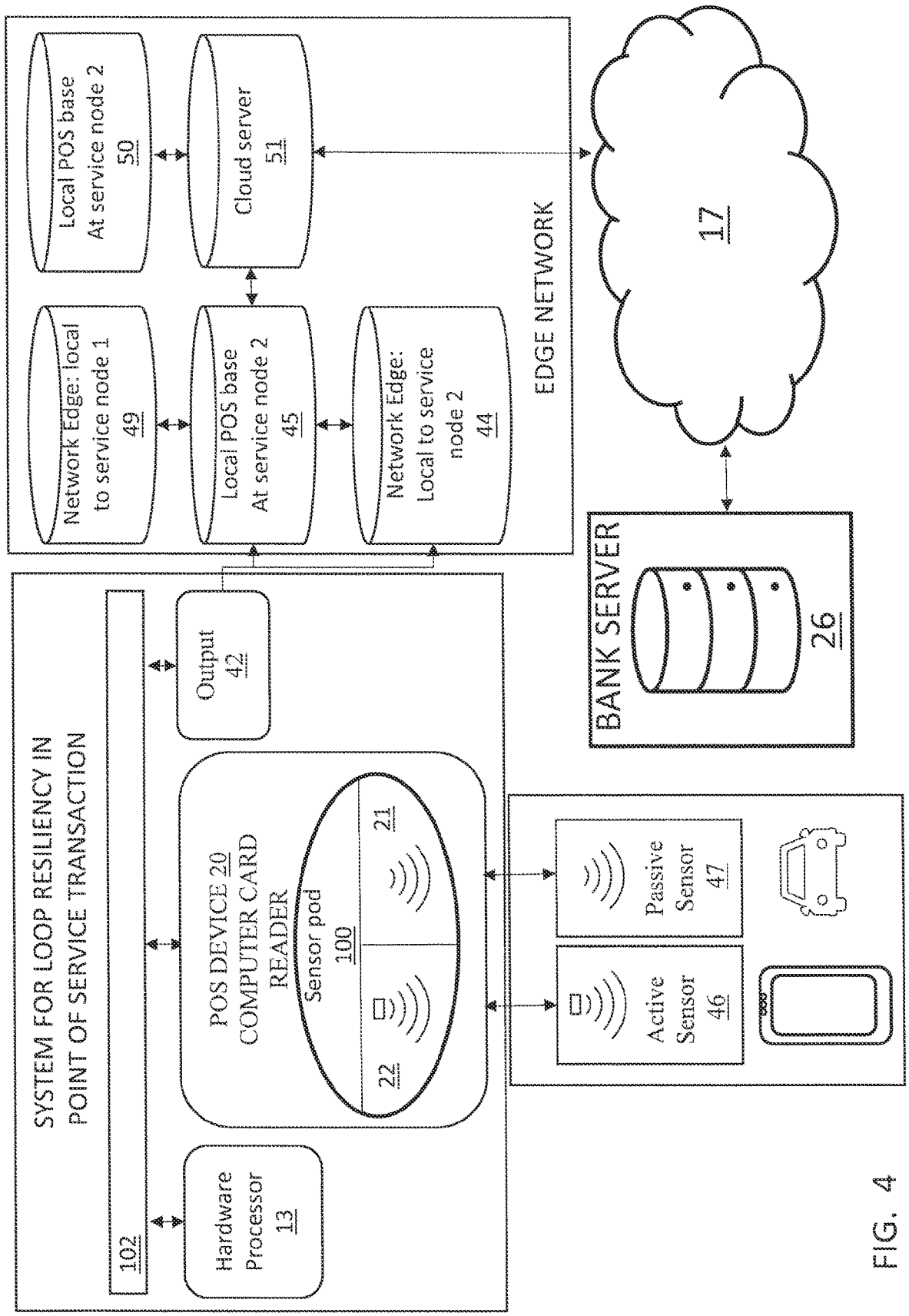
FIG. 4 is a block diagram illustrating a system that provides user loop resiliency at point of service transactions, in accordance with one embodiment of the present disclosure.

FIG. 1 illustrates an exemplary environment, in which systems, methods and computer program products are employed to provide user loop resiliency in point of service (POS) transaction. FIGS. 2 and 3 illustrates one embodiment of a method that provides user loop resiliency at point of service transactions. FIG. 4 illustrates one embodiment of a system that provides user loop resiliency at point of service transactions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a diagram illustrating an exemplary environment, in which the systems, methods and computer program products employ an active/passive twin sensor pod 100 in the point of service device 23 where the initial failure of the passive sensors 21 occurs, it triggers the user end device 25a, 25b, e.g., active sensor 22, to generate an active signal that transmits the wake-up event to the passive sensor 21 of the point of service (POS). In the example depicted in FIG. 1, the point of service environment, is a toll (for vehicular travel across) 24b or a laundromat 24a.

The point of service (POS) is the time and place where a retail transaction is completed. In the example depicted in FIG. 1, the retail transaction may be a toll 24b to travel on a roadway, or may be a purchase point to use a laundry machine 24a in a laundromat. At the point of sale, the merchant calculates the amount owed by the customer 10, indicates that amount, may prepare an invoice for the customer 10, and indicates the options for the customer 10 to make payment. In accordance, with the methods, systems and computer program products, payment is made by digital transaction. To calculate the amount owed by a customer 10, the user in the POS environment 15 may use various devices, such as weighing scales, barcode scanners, and cash registers. However, in some embodiments, none of this in necessary, as the entirety of the transaction may be through the internet. At this point, the customer 10 makes a payment to the merchant in exchange for goods or after provision of a service (collectively depicted as sale of product 24a, 24b). The payment is by digital transaction. "Digital transactions" are defined as transactions in which the customer authorizes the transfer of money through electronic means, and the funds flow directly from one account to another. These accounts could be held in banks, or with entities/providers.

To make a payment, payment terminals, touch screens, and other hardware and software options are available to the user, i.e., consumer. In some embodiments, mobile devices 23a are employed in the point of sale (POS) process to provide the interface for the aforementioned payment. The mobile device 23a may be a cellular phone, such as a smart phone. In other embodiments, the mobile device may be a vehicle having an internet of things (IoT) sensor present therein, as designated by reference number 23b.

The point of sale (POS) device may include a sensor pod 100 including both an active sensor 22 and passive sensor 21. An active sensor is a sensing device that requires an external source of power to operate; active sensors contrast with passive sensors, which simply detect and respond to some type of input from the physical environment. In the context of remote sensing, an active sensor is a device with a transmitter that sends out a signal, light wavelength or electrons to be bounced off a target, with data gathered by the sensor upon their reflection.

When an initial failure of the passive sensor occurs 21, it triggers the user end device, e.g., the mobile device 23a, 23b, to generate an active signal that transmits a wake up event to the passive sensor 21 in the point of service (POS) device, e.g., both the POS device includes the sensor pod 100.

In some embodiments, the passive sensor circuitry of the passive sensor 21 can trigger an alternate message in the computation system to enable receipt of the activity trigger and cause initiation of the activity similar to the existing active sensor path. For example, when the circuitry of the passive sensor 21 at the point of service (POS) is triggered, the wake-up alert with the corresponding identity (mobile number in most cases) is sent across the system to pool up the transaction or provide a negative acknowledgement if no pending transactions are available. This provides that the latest status of the account is obtained, such as latest update of credited transactions and corresponding journal entries of history for success or failure of financial transactions from the financial institutions, so that appropriate credit is provided at that point else the vehicle is triggered to stop till the financial transaction is cleared.

In some embodiments, transmittal of identity (IMEI/registered mobile number/pre-established secure hash) from the mobile device 23 to the passive sensor 21 at the point of service (POS) reduces the number of transactions that an user/end user device has to initiate. The International Mobile Equipment Identity (IMEI) is a number, usually unique, to identify 3GPP and iDEN mobile phones, as well as satellite phones.

If the network latency or failure is seen, the transaction is stored in the edge 24 for future reconciliation and the message contains also the last recorded balance from the transaction. By being stored in the edge 24, it is referred to as storage in an edge computing environment. Edge computing is computing that takes place at or near the physical location of either the user or the source of the data. In this case, the edge devices are positioned close to the point of sale (POS) environment. By placing computing services closer to these locations, users benefit from faster, more reliable services while companies benefit from the flexibility of hybrid cloud computing. Edge computing is one way that a company can use and distribute a common pool of resources across a large number of locations. Edge use cases are rooted in the need to process data locally in real time—situations where transmitting the data to a datacenter for processing causes unacceptable levels of latency. The edge computing environment may include a provider/enterprise core, a service provider edge, and end-user premises edge, and a device edge 24. The provider/enterprise core, the service provider edge, and the end-user premises edge may be collectively designated with reference number 17.

The provider/enterprise core is the traditional "non-edge" tier, owned and operated by public cloud providers, telco service providers, or large enterprises. The service provider edge are tiers that are located between the core or regional datacenters and the last mile access, commonly owned and operated by a telco or internet service provider and from which this provider serves multiple customers. The end-user premises edge is the edge tiers on the end-user side of the last mile access can include the enterprise edge (e.g., a retail store, a factory, a train) or the consumer edge (e.g., a residential household, a car). The device edge is a standalone (non-clustered) system(s) that directly connect sensors/actuators via non-internet protocols. This represents the far edge of the network. When referring to the transaction being stored in the edge for future reconciliation, the edge being referred to is the device edge.

Network latency, sometimes called lag, is the term used to describe delays in communication over a network. Latency meaning in networking is best thought of as the amount of time it takes for a packet of data to be captured, transmitted, processed through multiple devices, then received at its destination and decoded. An example of this can occur with bad weather and VSAT terminals. A very small aperture terminal (VSAT) is a data transmission technology used for many types of data management. VSAT can be used in place of a large physical network as it bounces the signal from satellites instead of being transported through physical means like an ethernet connection. However, they can be susceptible to transmission loss with bad weather.

In some embodiments, the methods, systems and computer program products reduce the time to restore service when the primary path fails and does not allow queueing to increase. Temporal changes in the ac e signal sensor and passive sensor fluctuations are also handled by the process flows described herein.

FIGS. 2 and 3 illustrate one embodiment of a method flow for providing user loop resiliency in point of service (POS) transactions. The method can include at least two paths for the process flow. There is a primary process flow and an alternative process flow (also referred to as secondary flow).

In some embodiments of the primary process flow, during a transaction, the point of service (POS) device 20 has an internet of things (IoT) based primary active sensor 21 that generates signal and a user end device 23a, 23b has IoT based primary passive sensor that transforms the received signal and sends it back to the primary active sensor 22 in the POS device 20. In some embodiments, transforming the received signal may include adding identification information for the user to the signal and then sending it back to the PUS device 20. In some examples, the signal is read in the sensor bay 100 of the POS device 20. The sensor bay 100 of the POS device 20 includes the passive sensor 21 teamed with an active sensor 22 in a sensor pod 200. The backend transactions in the workflow are triggered, such as associating the recognized identification (ID) with say a toll pay account, the amount of toll at the corresponding toll gate recognized, the amount deducted in the registered toll pay account, triggering a SMS message to be sent to the registered mobile number and dispatch of control. The transaction completes successfully, and the paid for activity is initiated through dispatch of the control signal.

The alternative process flow (secondary process flow) includes an alternative path in resilience mode. In the alternative process flow, the user end device 23a, 23b has an internet of things (IoT) based primary passive sensor that transforms the received signal, and sends it back to the primary active sensor 22 in the point of service (POS) device, e.g., the sensor pod 100 of the POS device. The primary active sensor 22 in the POS device does not recognize the transformed signal and does not trigger the transaction and activity as the signal is not read in the sensor bay, e.g., the sensor pod 100 of the POS device. If the user end device recognizes that the passive sensor 26 has not worked by sending the signal to the active sensor 22 of the point of sale device, the end user device triggers a light/audio pulse with the identity and last balance known to a passive sensor 21 in the sensor pod 100 in the POS device. The sensor pod 100 of the point of service device includes both an active sensor 22 for the transaction, and a passive sensor 21 that is used for providing increased resiliency in the scenarios in which the process flow of the primary path fails. The passive sensor 21 within the pod 100 receiving the signal from the user's device, which recognized that the original passive signal did not trigger the transaction and activity, triggers a wake-up process in the system, or the passive sensor within the pod 100 stores the transaction information in the network edge 27. The network edge 27 will recognize that error lies in the systems involved and displays it at the node (sensory bay) to trigger the passive sensor 22. The user end device 23 uses an available prop to trigger the secondary/passive sensor 22. In one example, a torch (light, e.g., flash) and a SMS message is sent if the mobile camera does not have a flash. The term "prop" denotes a means to facilitate the interaction between the consumer, e.g. user 10, and the POS device 15.

The signal from the secondary/passive sensor of the sensor pod 100 of the POS device 20 is read in the sensor bay 100, and the back-end transaction leading to generation of the control signal for the task/service/activity is initiated. The transaction completes successfully, and the task/service/activity commences. In some embodiments, the task/service/activity may be the raising of the boom barrier to allow the vehicle to pass or for a wash cycle to get initiated, etc.

The method flow for providing user loop resiliency in point of service transactions using the first and second paths is now described with reference to FIG. 2. In some embodiments, the method may begin with block 1, which can include registration of a user with end user device identity, initial charging of amount, other authorization information, etc. in app or non-app mode. The user can register the device through which the user is making purchases using the point of sale (POS) environment by digital transactions. As noted above, the device may be a mobile computing device, such as a smart phone. The registration process may include memory in the POS environment for saving registration data on the user. Because the registration process employs identification To the extent that implementations of the system for providing user loop resiliency in point of service transactions collect, store, or employ personal information provided by, or obtained from, individuals (for example, current locations of the user, historical word usage, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

At block 2, the user brings the device into the PUS sensor active area to initiate a transaction, e.g., a purchase of goods or services. The POS sensor active area includes the use of an active sensor to read data for the purposes of making a sale. This could include reading a barcode, etc. It could be any type of sensor for detecting a sale. The active sensor could be an optical sensor. The active sensor could read a LiFi signal. Both the first and second process flows begin with block 1.

Referring to block 3, a determination is made as to whether a transaction, e.g., sale, has been completed within a specified time. The transaction may start with a designation of the value for goods or service to be purchased by the user. The end of the transaction may be the completion of a digital payment. Present time periods may be defined to illustrate when a transaction is proceeding in a positive or negative manner.

If the transaction is completed within the specified time, the method may continue to block 13. An off page reference noted as "A" on FIG. 2 and "A" in FIG. 3 illustrates continuity between these steps that are depicted in differently number figures, i.e., FIG. 2 and FIG. 3. At block 13, the system deducts the service charge from the latest balance and issues the control signal to trigger the activity/service at the node end point. For example, if the user (consumer 10) is purchasing a toll to travel on a roadway, the active sensor 22 at the POS device 20 may send a signal to the toll booth 24b to open or close the boom that allows for entry of a car onto the toll road. For, example, if the user (consumer 10) is purchasing laundry services from a washer or dryer, the active sensor 22 at the PUS device may send a signal to the washer or dryer to start the wash or dry cycle.

Under these circumstances, the process flow ends. This process flow is one example of a primary process flow (e.g., first process flow).

However, if the transaction is not completed within the specified time at block 3, the method may continue to block 4. At block 4 of FIG. 2, a determination is made whether the active sensor 22 at the PUS environment is functioning. Functionality of the active sensor at the PUS can be sensed using the passive sensor in the user's 10 (e.g., consumer's) device, 23b. An active/passive twin sensor pod 100 is present in the point of service device 20. When the initial failure of the passive sensor occurs, it triggers the user end device to generate a signal that transmits the wake up event to the passive sensor of the point of sale (PUS). This occurs at block 5.

If it is determined that the user's end device is not functioning, the method can advance to block 12. An off page reference noted as "B" on FIG. 2 and "B" in FIG. 3 illustrates continuity between these steps that are depicted in differently number figures, i.e., FIG. 2 and FIG. 3. At block 12, alternate paths for users not having functionality for active sensors is considered, in which a message, e.g., Short Message Service (SMS) text message, is sent to the registered number of the user's device 23a, 23b with the PUS identity (e.g., identity of the PUS device 20) and a trigger to a secondary source from the user's device 23a, 23b to the passive sensor 21 of the sensor pod 100 in the PUS device 100. The trigger from the user's device can be an activated by a LiFi enabled signal. "Li-Fi (also written as LiFi)" is a wireless communication technology which utilizes light to transmit data and position between devices. In some examples, the LiFi signal may be provided by a mobile camera flash or an ultrasound ping with data riding the signal envelope or an TDM (Time Division Multiplexing)/FDM (Frequency Division Multiplexing) mode.

In this process flow, the method may continue to block 13. The passive sensor 21 of the sensor pod 100 can activated by a LiFi enabled signal from the user's device 23a, 23b. In turn, the passive sensor 21 can then wake up the active sensor 22 of the sensor pod 100. At block 13, the system deducts the service charge fro the latest balance and issues the control signal to trigger the activity/service at the node end point. For example, if the user (consumer 10) is purchasing a toll to travel on a roadway, the active sensor 22 at the PUS device 20 may send a signal to the toll booth 24b to open or close the boom that allows for entry of a car onto the toll road. For, example, if the user (consumer 10) is purchasing laundry services from a washer or dryer, the active sensor 22 at the PUS device may send a signal to the washer or dryer to start the wash or dry cycle.

Under these circumstances, the process flow ends. This process flow is one example of a second process flow (e.g., alternative process flow).

Referring back to block 4, if it is determined at block 4 that the user's end device is functioning, the method can advance to block 5. Block 5 can include the user's end device automatically triggering activation signal to the passive sensor in the PUS pod 100 with the activation ID and balance, as well as other details. Continuing to block 6, the passive sensor 21 at the PUS pod 100 is activated and issues a wake-up alert across the system.

Referring to block 7, a determination is made if the network is active. If the network is active at block 7, the method can continue to block 9 of FIG. 3. An off page reference noted as "C" on FIG. 2 and "C" in FIG. 3 illustrates continuity be these steps that are depicted in differently number figures, i.e., FIG. 2 and FIG. 3. Block 9 can include a wake up alert or edge device coming online. In this instance, the wake tip alert or edge device initiates a system wide update request for one or several subscribers.

In some embodiments, referring to block 10, the method may continue with the points of data interface responding with latest transaction and status, or negative acknowledgment iii the emergency queues.

Block 11 includes the points of service being updated with the latest transaction and balance states for the subscriber of the service.

Block 12 includes alternate paths for users not having functionality for active sensors is considered, in which a message, e.g., Short Message Service (SMS) text message, is sent to the registered number of the user's device 23a, 23b with the POS identity (e.g., identity of the POS device 20) and a trigger to a secondary source from the user's device 23a, 23b to the passive sensor 21 of the or pod 100 in the POS device 100. The trigger from the user's device can be an activated by a LiFi enabled signal. "Li-Fi (also written as UFO" is a wireless communication technology which utilizes light to transmit data and position between devices. In some examples, the LiFi signal may be provided by a mobile camera flash or an ultrasound ping with data riding the signal envelope or an TDM (Time Division Multiplexing)/FDM (Frequency Division Multiplexing) mode.

In this process flow, the method may continue to block 13. The passive sensor 21 of the sensor pod 100 can activated by a LiFi enabled signal from the user's device 23a, 23b. In turn, the passive sensor 21 can then wake up the active sensor 22 of the sensor pod 100. At block 13, the system deducts the service charge from the latest balance and issues the control signal to trigger the activity/service at the node end point. For example, if the user (consumer 10) is purchasing a toll to travel on a roadway, the active sensor 22 at the POS device 20 may send a signal to the toll booth 24h to open or close the boom that allows for entry of a car onto the toll road. For, example, if the user (consumer 10) is purchasing laundry services from a washer or dryer, the active sensor 22 at the PUS device may send a signal to the washer or dryer to start the wash or dry cycle.

Under these circumstances, the process flow ends. This process flow is one example of a second process flow (e.g., alternative process flow).

Referring back to block 7 of FIG. 2, if the system is active, the process flow can continue to block 8, which includes the edge computer at the POS node is activated from passive to active mode and the transaction is recorded. The method continues to block 9 of FIG. 3. An off page reference noted as "D" on FIG. 2 and "D" in FIG. 3 illustrates continuity between these steps that are depicted in differently number figures, i.e., FIG. 2 and FIG. 3. Block 9 can include a wake up alert or edge device coming online. In this instance, the wake up alert or edge device initiates a system wide update request for one or several subscribers. The method can then continue through blocks 10-13, as described above.

The methods, and correlated systems and computer program products, can provide benefits, such as a reduced time to restore service when the primary path fails and does not allow queueing to increase Latency effects from backend system sync or for cross enterprise transactions is reduced allowing smoother functioning of the POS systems. Latency can be reduced by a distributed load, asynchronous threading calls, and sync up mechanism between parallel edges In instances where the initial diagnosis is "insufficient balance" even though the wallet was successfully recharged, and the transaction has not reflected in the system due to latency. The proposed solution also focuses on reducing latency via edge computing by: implementing asynchronous threading calls to the network edge rather than making consistent synchronous calls to the origin server; implementation of time bound sync mechanisms between the parallel edges to ensure real time reflection of data across all parallel network edges; and using cognitive mechanism to provide credit of a recharge based on initial pre-approval from the financial institution while waiting for the final confirmation.

FIG. 4 is a block diagram illustrating a system that provides user loop resiliency at point of service transactions, in accordance with one embodiment of the present disclosure. In the example depicted in FIG. 4, the POS device 20 includes a computer card reader. The POS device 20 includes a sensor pod 100 including an active sensor 22 and a passive sensor 20. The POS device 20 also includes at least one hardware processor 13 and an interface for communicating with a network, such as an edge cloud computing network. The sensor pod 100 has been described in greater detail about with reference to FIGS. 1-3. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

The POS device 20 also includes an interface for communicating with an edge computing environment. Each of the hardware processor 13, the POS device 20 and the interface 42 may be in communication across a system bus 102.

The interface 42 is in electrical communication with an edge computing environment. The Edge computing environment may include network edge devices, e.g., network edge: local to service node 1, and network edge: local to service node 2; a local POS base at service nodes 1 and 2; and a cloud server 51. The edge computing environment may be in communication with payment servers, e.g., a band server, through the internet 17.

Figure 5:
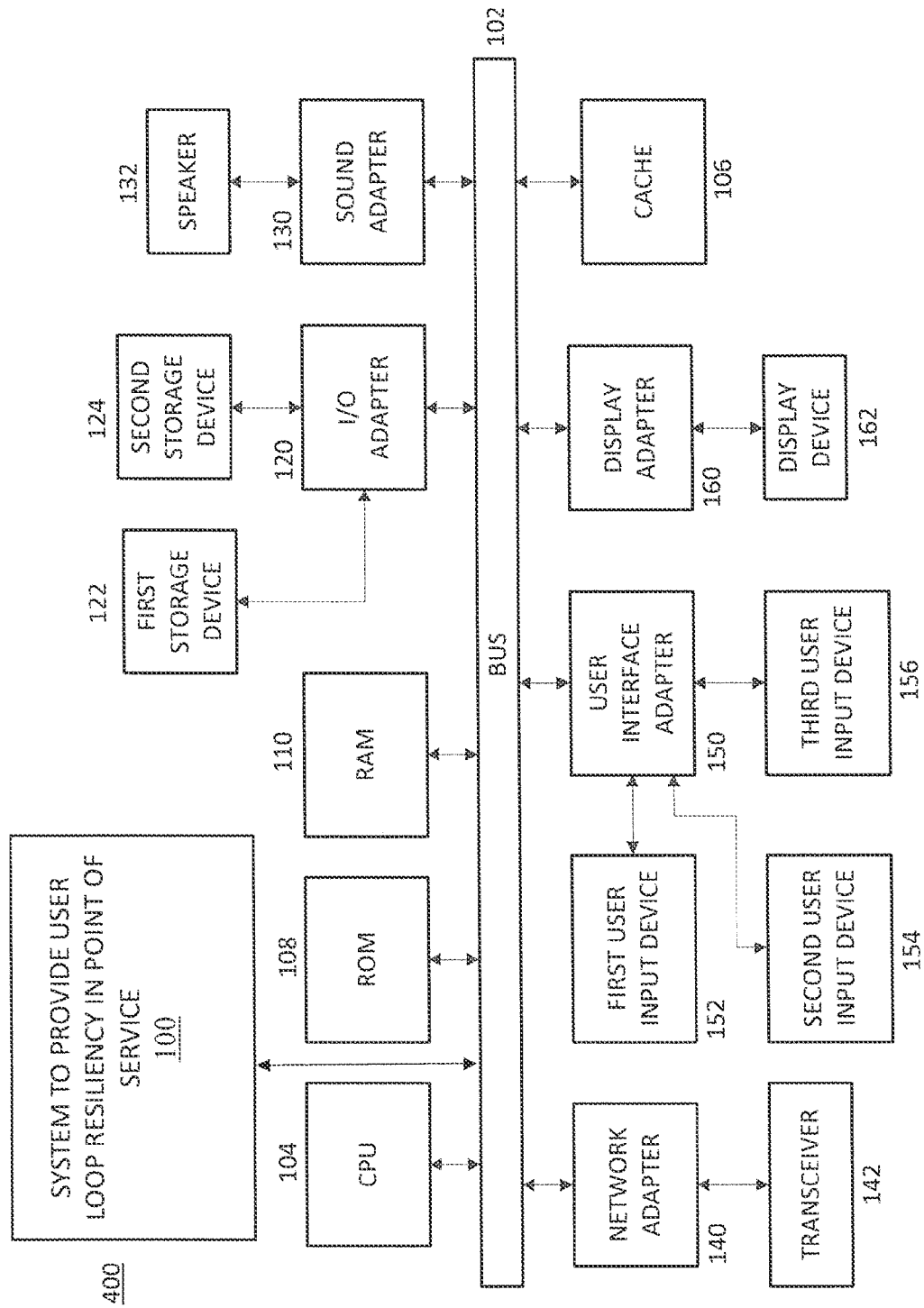
FIG. 5 is a block diagram illustrating a system that can incorporate the system that provides carbon aware streaming plans that is depicted in FIG. 4, in accordance with one embodiment of the present disclosure.
Figure 6:
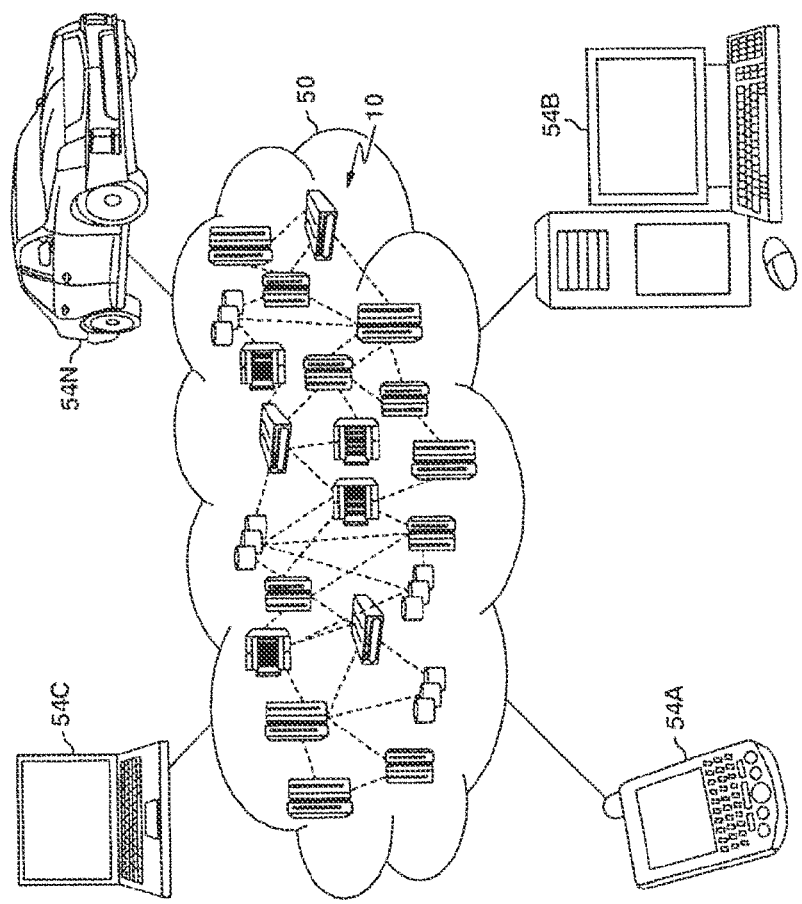
FIG. 6 depicts a cloud computing environment according to an embodiment of the present disclosure.
Figure 7:
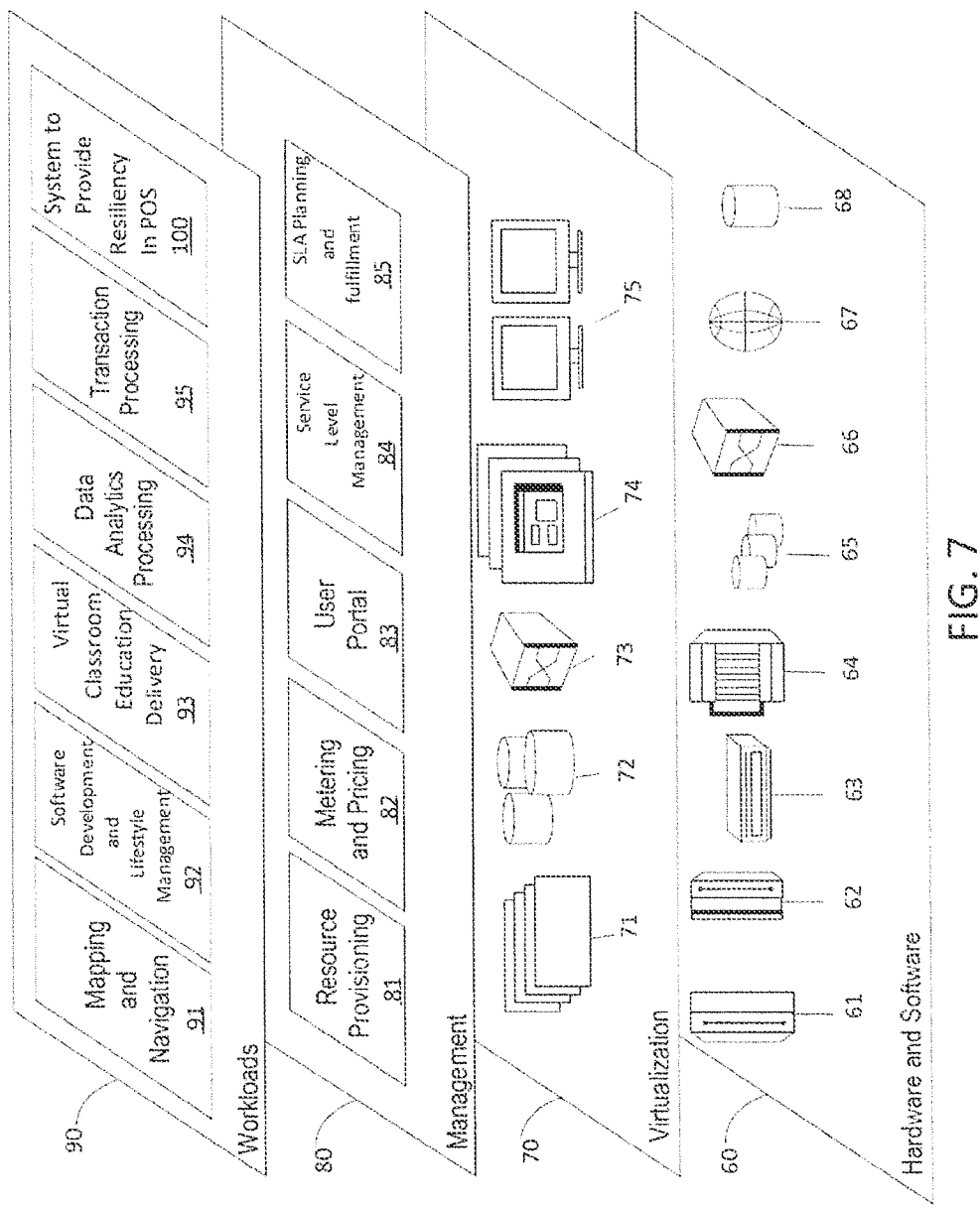
FIG. 7 depicts abstraction model layers according to an embodiment of the present disclosure.

FIG. 5 is an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

These and other variations of a hardware processor subsystem are also contemplated in accordance with embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Referring now to FIG. 10, illustrative cloud computing environment 150 is depicted. As shown, cloud computing environment 150 includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 54A-N shown in FIG. 10 are intended to be illustrative only and that computing nodes and cloud computing environment 150 can communicate with any type of computerized device over any type of network and/or network addressable connection (e.g., using a web browser).

Referring now to FIG. 11, a set of functional abstraction layers provided by cloud computing environment 150 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the system 100 that provides user loop resiliency in point of service transactions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method to provide user loop resiliency in point of service transactions (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for performing point of service transactions comprising:
   configuring a point of service (POS) environment with a sensor pod for conducting digital financial transactions, the sensor pod including an active sensor and a passive sensor;
   sending a first signal from the active sensor of the sensor pod to a user device that is initiating a sale for a service;
   receiving a converted version of the first signal from the user device at the active sensor, wherein the converted version of the first signal includes identification information for the user;
   determining that the active sensor of the sensor pod of the point of service environment has not functioned to receive the converted version of the first signal;
   receiving a user wake up signal from the user device at the passive sensor of the sensor pod; and
   restoring functionality of the active sensor with a point of service (POS) wake up signal sent from the passive sensor of the sensor pod to the active sensor of the sensor pod.

2. The computer-implemented method of claim 1 further comprising storing data from the converted version of the first signal when it is determined that the active sensor has not functioned.

3. The computer-implemented method of claim 1, wherein the data is stored in an edge device of an edge cloud computing environment.

4. The computer-implemented method of claim 1, wherein the sensor pod is integrated into a card reader of a point of service device.

5. The computer-implemented method of claim 1, wherein the point of service environment includes a toll transaction for entry onto a travel way.

6. The computer-implemented method of claim 1, wherein the point of service environment includes a transaction for a vending machine for goods or services.

7. The computer-implemented method of claim 1, wherein the user device is a mobile device, and transmits data for securing financial payment to the point of service environment from a banking or credit institution.

8. A system for performing point of service transactions comprising:
   a hardware processor; and
   a memory that stores a computer program product, which, when executed by the hardware processor, causes the hardware processor to:
   configure a point of service (POS) environment with a sensor pod for conducting digital financial transactions, the sensor pod including an active sensor and a passive sensor;
   send a first signal from the active sensor of the sensor pod to a user device that is initiating a sale for a service;
   receive a converted version of the first signal from the user device at the active sensor, wherein the converted version of the first signal includes identification information for the user;
   determine that the active sensor of the sensor pod of the point of service environment has not functioned to receive the converted version of the first signal;
   receive a user wake up signal from the user device at the passive sensor of the sensor pod; and
   restore functionality of the active sensor with a point of service (POS) wake up signal sent from the passive sensor of the sensor pod to the active sensor of the sensor pod.

9. The system of claim 8 further comprising storing data from the converted version of the first signal when it is determined that the active sensor has not functioned.

10. The system of claim 8, wherein the data is stored in an edge device of an edge cloud computing environment.

11. The system of claim 8, wherein the sensor pod is integrated into a card reader of a point of service device.

12. The system of claim 8, wherein the point of service environment includes a toll transaction for entry onto a travel way.

13. The system of claim 8, wherein the point of service environment includes a transaction for a vending machine for goods or services.

14. The system of claim 8, wherein the user device is a mobile device, and transmits data for securing financial payment to the point of service environment from a banking or credit institution.

15. A computer program product that performs point of service transactions comprising a computer readable storage medium having computer readable program code embodied therewith, the program instructions executable by a processor to cause the processor to:

configure, using the processor, a point of service (POS) environment with a sensor pod for conducting digital financial transactions, the sensor pod including an active sensor and a passive sensor;

send, using the processor, a first signal from the active sensor of the sensor pod to a user device that is initiating a sale for a service;

receive a converted version of the first signal from the user device at the active sensor, wherein the converted version of the first signal includes identification information for the user;

determine, using the processor, that the active sensor of the sensor pod of the point of service environment has not functioned to receive the converted version of the first signal;

receive, using the processor, a user wake up signal from the user device at the passive sensor of the sensor pod; and restore, using the processor, functionality of the active sensor with a point of service (POS) wake up signal sent from the passive sensor of the sensor pod to the active sensor of the sensor pod.

16. The computer program product of claim 15 further comprising storing data from the converted version of the first signal when it is determined that the active sensor has not functioned.

17. The computer program product of claim 15, wherein the data is stored in an edge device of an edge cloud computing environment.

18. The computer program product of claim 15, wherein the sensor pod is integrated into a card reader of a point of service device.

19. The computer program product of claim 15, wherein the point of service environment includes a toll transaction for entry onto a travel way.

20. The computer program product of claim 15, wherein the point of service environment includes a transaction for a vending machine for goods or services.

\* \* \* \* \*